No. 787,526. PATENTED APR. 18, 1905.
E. MILLER.
GLASS MOLDING MACHINE.
APPLICATION FILED JAN. 19, 1905.

4 SHEETS—SHEET 1.

Witnesses
Benj. Finckel
Oda Eckstein

Inventor
Edward Miller
by Finckel & Finckel
his Attorneys

No. 787,526. PATENTED APR. 18, 1905.
E. MILLER.
GLASS MOLDING MACHINE.
APPLICATION FILED JAN. 19, 1905.

4 SHEETS—SHEET 2.

Witnesses
Benj. Finckel
Oda Eckstein

Inventor
Edward Miller,
by Finckel & Finckel
his Attorneys

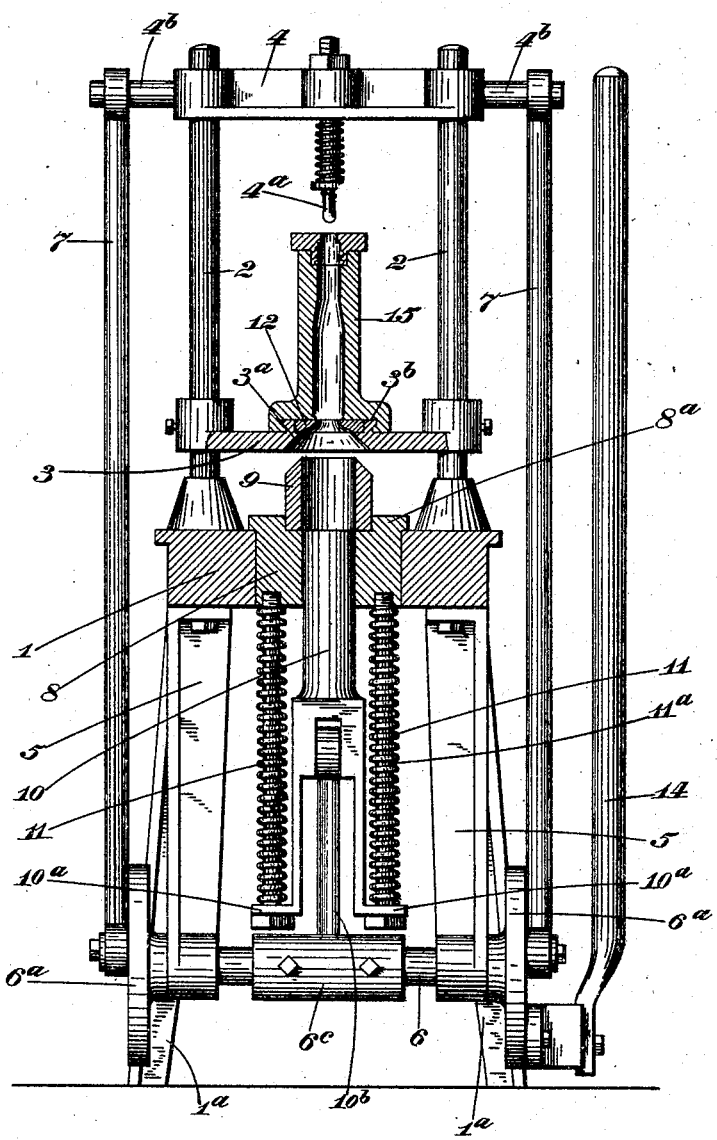

No. 787,526. PATENTED APR. 18, 1905.
E. MILLER.
GLASS MOLDING MACHINE.
APPLICATION FILED JAN. 19, 1905.
4 SHEETS—SHEET 4.
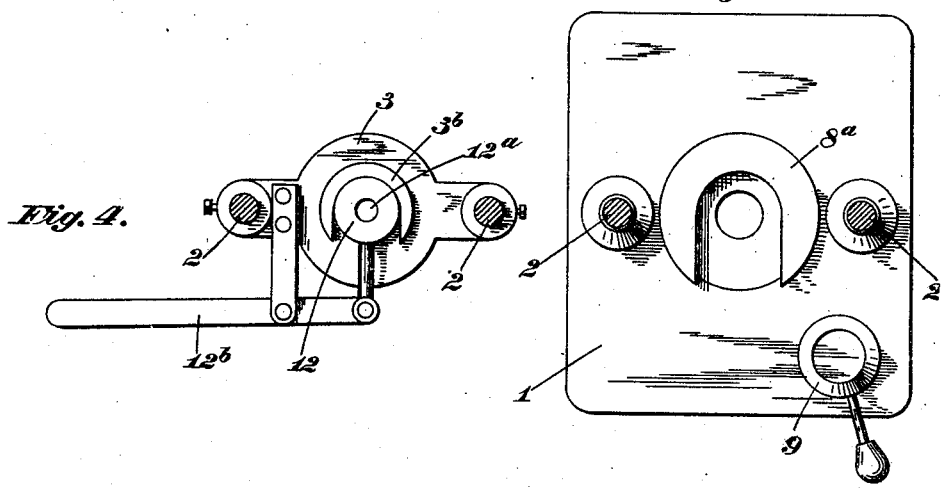
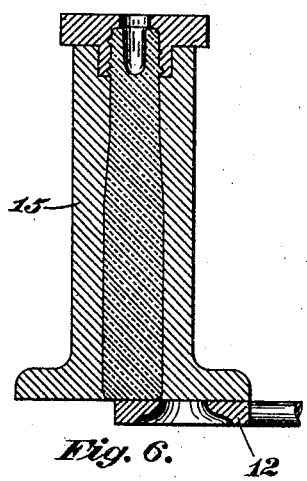
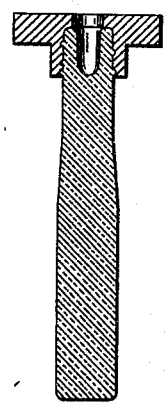
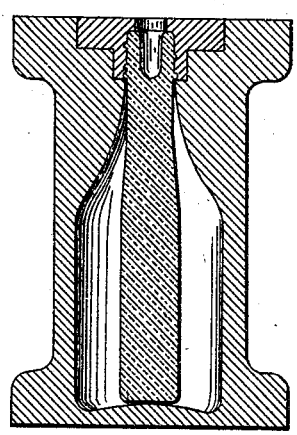
Witnesses
Benj. Finckel
Oda Eckstein
Inventor
Edward Miller;
by Finckel & Finckel
his Attorneys No. 787,526.                                                                 Patented April 18, 1905.

UNITED STATES PATENT OFFICE.

EDWARD MILLER, OF COLUMBUS, OHIO.

GLASS-MOLDING MACHINE.

SPECIFICATION forming part of Letters Patent No. 787,526, dated April 18, 1905.

Application filed January 19, 1905. Serial No. 241,767.

*To all whom it may concern:*

Be it known that I, EDWARD MILLER, a citizen of the United States, residing at Columbus, in the county of Franklin and State of Ohio, have invented certain new and useful Improvements in Glass-Molding Machines; and I do hereby declare the following to be a full, clear, and exact description of the invention, such as will enable others skilled in the art to which it appertains to make and use the same.

More particularly, the present invention relates to that class of glass-molding machines in which the molten glass is supplied in a definite quantity to a parison-mold. As is well known, the molten glass is given in a parison-mold a definite form preparatory to placing it in the blow-mold, where it receives its final form, so far as the molding process is concerned, and for the sake of uniformity in weight, thickness, &c., it is important that the quantity of glass delivered to the parison-mold be always as nearly as practicable the same.

The object of the invention is to provide a simple, cheap, and easily-operative machine whereby the work referred to can be economically and expeditiously performed; and the invention consists in the construction and combination of parts hereinafter described and claimed, the invention not being confined to the particular forms that I here illustrate and describe in exemplification thereof.

Figure 1:
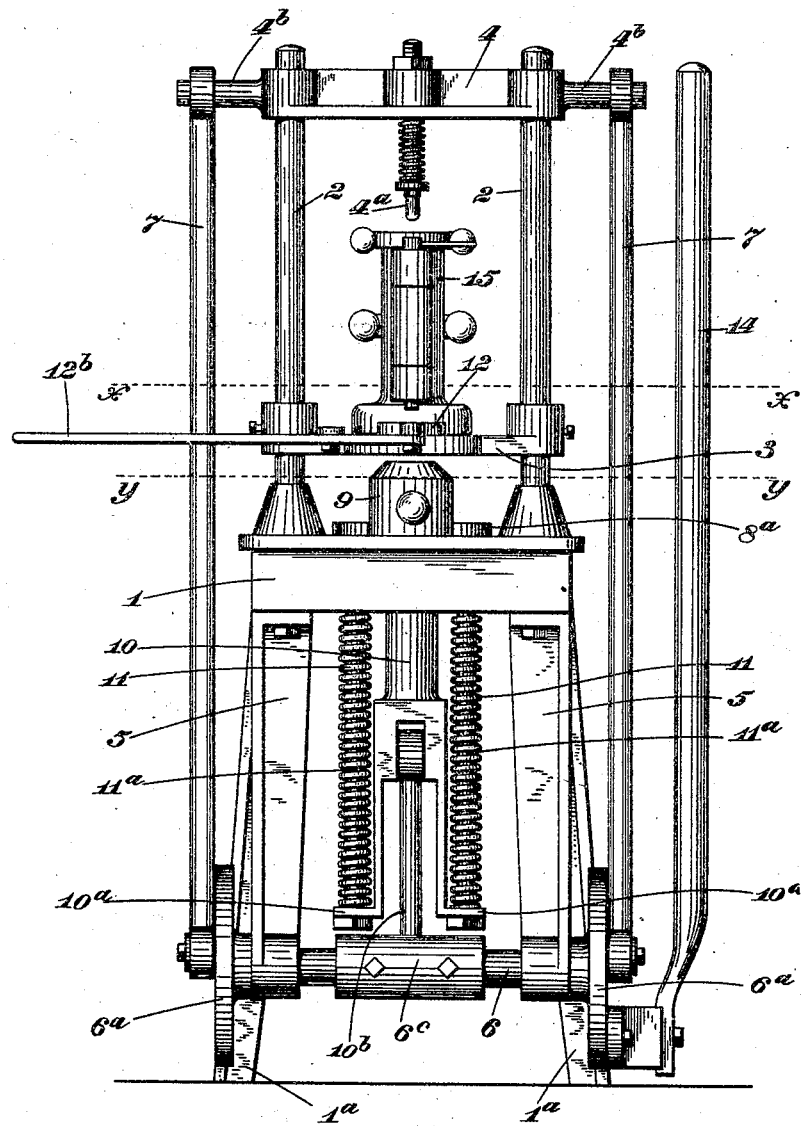
Figure 2:
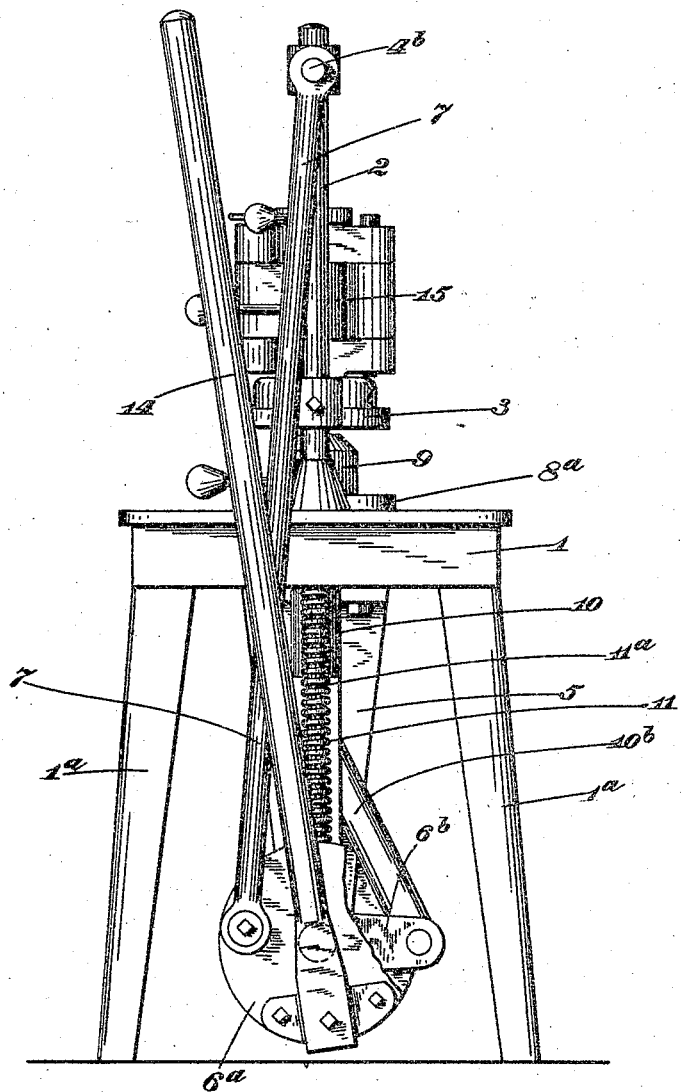

In the accompanying drawings, Figure 1 is a front view in elevation. Fig. 2 is an elevation of the right-hand side of the machine as seen in Fig. 1. Fig. 3 is a view mainly in front elevation, but partially in section. Fig. 4 is a detail in plan and section illustrating the cutter as viewed from plane $x\ x$, Fig. 1. Fig. 5 is the same sort of view with an illustration of the cup for receiving and placing in position the molten glass as viewed from plane $y\ y$, Fig. 1. Fig. 6 is a vertical sectional view of the parison-mold with a parison formed therein. Fig. 7 shows the parison removed and held in the neck-ring ready for lodgment in the blow-mold. Fig. 8 shows the parison placed in the blow-mold ready for the blowing operation.

In the views, 1 designates a stationary table. This is supported on appropriate legs $1^a$. Extending upward from the table are parallel columns 2, between the lower portions of which is secured (preferably adjustably) the parison-mold support 3. Sliding on the upper portions of the columns 2 is a cross-head 4, carrying a yielding punty $4^a$. Hung in the lower end of brackets 5, depending from the under side of the table 1, is a rock-shaft 6, having on each of its projecting ends disks $6^a$.
Connecting the disks $6^a$ and studs $4^b$, projecting from opposite ends of the cross-head 4, are rods 7, adapted to reciprocate the cross-head when the shaft 6 is rocked.

8 designates a carrier for the cup that is to receive the molten-glass batch. This carrier is slidable vertically in the tables and is provided with a rim $8^a$, projecting both vertically and horizontally to serve as a guiding-seat for properly positioning the cup and also as a stop to limit the downward movement of the carrier in the table.

9 designates the cup that receives the molten glass. This is open at its lower end and beveled at its upper end; but the lower end is closed to contain and carry glass by placing and moving the cup with its lower end in contact with the table 1, as seen in Fig. 5.

10 designates a plunger that reciprocates vertically through the carrier 8 and into the molten-glass-receiving cup 9. The plunger 10 and carrier 8 are yieldingly connected to each other by means of coiled springs 11, placed between the carrier and projecting feet $10^a$ on the plunger, the springs being maintained in proper position by means of rods $11^a$, passed through the feet and nutted at their lower ends. The plunger 10 is reciprocated by means of a link or rod $10^b$, connecting the plunger, and a crank-arm $6^b$, having a sleeve $6^c$, by means of which it is secured to the rock-shaft 6. The point of connection of the crank-arm $6^b$, however, is on one side of the axis of the rock-shaft 6, while the points of connection of the rods 7 are on the opposite side, so that rocking of the shaft will reciprocate the plunger and punty $4^a$ in contrary directions at the same time.

The parison-mold support 3 is made with an opening $3^a$, tapered upward to receive with a close fit the beveled upper end of the cup 9. Around the margin of the upper edge of this opening, but set a little away therefrom, is an arc-shaped boss or projection $3^b$, adapted to guide and properly locate the cutter 12 (hereinafter described) and also to form a seat for the parison-mold. For this latter purpose the projection $3^b$ is undercut around its outer side, and the lower ends of the sections of the parison-mold are correspondingly formed to fit and catch under the projection, and therefore to be locked thereto when the mold-sections are latched together.

12 designates the cutter for severing the surplus glass from the lower end of the parison after the mold has been filled with the molten glass by the upward movement of the plunger The cutter, as shown, consists of a disk having a central part $12^a$, the edges of which are tapering upward to form a suitable glass-cutting edge, the opening when the cutter is in place alining with the opening in the parison-mold support, thus forming practically a compound-curved prolongation of the tapering opening in said parison-mold support, as best seen in Fig. 6. The cutter is shown to be operative with a sliding movement across the lower end of the parison-mold, a hand-lever $12^b$, pivoted on the mold-support, being shown as having one end attached to the cutter for this purpose. When the surplus glass is cut off the lower end of the parison, it drops down into the cup, and the latter being removable at will is pulled out and the scrap shaken out or allowed to fall beyond the table out of the way. It will be observed that because the sides of the port of the cutter form a continuation of the sides of the cavity of the parison-mold it is not necessary to separate the mold and its support before the cutter can be moved to cut off the surplus glass. The result of this is that a clean cut of the surplus glass can be made, leaving the parison-mold supplied with its modicum of the glass in perfect form to be blown when transferred to the blow-mold.

14 designates a hand-lever, shown to be attached to the right-hand disk $6^a$, Figs. 1 and 3, on the rock-shaft 6 for the purpose of operating the plunger and punty.

The mold for forming the parison is designated 15. It is composed mainly, like an ordinary blow-mold, of two sections hinged together. Fitting in the top of the main portion of the mold is an independent pair of sections constituting the neck-ring for imparting the desired shape to the neck of the bottle, jar, or other vessel—as, for example, a screw-thread. The neck-ring is removable from the main body of the mold, and will be, in practice, left clamped on the parison for the purpose of transferring the latter to the blow-mold. In Fig. 8 I have illustrated the parison in position in the blow-mold ready to be blown.

The operation, which it is believed can be readily gathered from what has already been said, is briefly as follows: A batch or lump of molten glass of sufficient or rather more than sufficient quantity to form the jar or other vessel is first put into the cup 9, and the latter moved into proper position between the mold and the plunger 10. The hand-lever 14 is then pulled toward the left, as viewed in Fig. 2. The first part of the operation lifts the carrier 8 until the upper end of the cup fits in the opening at the under side of the mold-support and depresses the punty into the neck-ring, and the latter part of the operation raises the plunger through the cup, forcing the molten glass therein up into the mold. After the plunger and molten-glass receptacle have been lowered by the reverse movement of the lever 14 the lever $12^b$ is operated to cut off the surplus glass projecting below the end of the mold, which surplus glass drops back into the receptacle and is removed by withdrawing the receptacle, as before indicated.

What I claim, and desire to secure by Letters Patent, is—

1. In a glass-molding machine, the combination of a mold-support provided with an opening, means whereby a mold having an open end may be held with its opening coinciding with the opening in the mold-support, a receptacle for the molten glass having open ends adapted to be brought to coincide with the opening in the mold, and a cutter having a port the sides of which form a continuation of the sides of the cavity of the mold adapted to be interposed between the molten-glass receptacle and the mold to remove surplus glass from the end of the mold.

2. In a glass-molding machine, the combination of a mold-support provided with an opening with means whereby a mold having an opening may be held with its opening coinciding with the opening in said support, a cutter having a port adapted to be interposed between the support and the mold with the sides of its port coinciding with and forming a continuation of the sides of the opening in the support and to the mold and means for forcing molten glass through the openings in the support and cutter into the mold.

3. In a glass-molding machine, the combination of a mold-support provided with an opening, means whereby a mold having an opening may be held with its opening coinciding with the opening in said support, a carrier for a molten-glass receptacle having a plunger-opening, a movable molten-glass receptacle open at both ends adapted to be interposed between the said carrier and the mold-support with its open ends coinciding with the openings in said support and carrier, a plunger to work in said molten-glass-receptacle carrier, and means for moving the said carrier to bring the molten-glass receptacle against the support and the plunger to force the molten glass out of the receptacle.

4. In a glass-molding machine, the combination of a mold-support provided with an opening, means whereby a mold open at both ends may be held with one open end coinciding with the opening in said support, a carrier for a molten-glass receptacle having an opening, a movable molten-glass receptacle open at both ends adapted to be interposed between the said carrier and the mold-support with its open ends coinciding with the openings in said support and carrier, a plunger to work in said molten-glass carrier to force the glass out of the receptacle through one of the open ends of the mold, a punty to enter the other open end of the mold, means for effecting the entry of the punty into the mold and the operation of the plunger jointly.

5. In a glass-molding machine, the combination of a mold-support provided with an opening, means whereby a mold having an opening at each end may be held with one of its openings coinciding with the opening in said support, a carrier for a molten-glass receptacle having a plunger-opening, a movable molten-glass receptacle open at both ends adapted to be interposed between the said carrier and the mold-support with its open ends coinciding with the openings in said support and carrier, a plunger to work in said carrier, a punty to enter the other open end of the mold, and means for first closing the molten-glass receptacle against the mold-support and effecting the entry of the punty into the mold and subsequently operating the plunger to force the glass out of the receptacle into the mold.

6. In a glass-molding machine, the combination of a stationary table, a mold-support provided with an opening, means whereby a mold having an opening at each end may be held with one of its openings coinciding with the opening in said support, a movable carrier for a molten-glass receptacle having a plunger-opening, and sliding with a limited movement in said stationary table, a movable molten-glass receptacle open at both ends adapted to be interposed between the said carrier and the mold-support with its open ends coinciding with the openings in said support and carrier, a plunger to work in said carrier, a punty to enter the other open end of the mold, and means for first closing the molten-glass receptacle against the mold-support and effecting the entry of the punty into the mold and subsequently operating the plunger to force the glass out of the receptacle into the mold.

In testimony whereof I affix my signature in presence of two witnesses.

EDWARD MILLER.

Witnesses:
  Oda Eckstein,
  Samuel W. Latham.